(12) United States Patent
Knapp et al.

(10) Patent No.: US 6,680,354 B2
(45) Date of Patent: Jan. 20, 2004

(54) HIGH CONCENTRATION AGITATION OF PVA POLYMER POWDERS

(75) Inventors: William J. Knapp, Belpre, OH (US); Richard K. Grenville, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/201,054

(22) Filed: Jul. 23, 2002

(65) Prior Publication Data

US 2003/0036600 A1 Feb. 20, 2003

Related U.S. Application Data

(60) Provisional application No. 60/307,408, filed on Jul. 24, 2001.

(51) Int. Cl.[7] ................................................ C08L 29/04
(52) U.S. Cl. ........................ 524/557; 523/315; 523/318; 523/319; 523/322; 523/324; 523/343; 525/62
(58) Field of Search .............................. 525/62; 523/315, 523/318, 319, 322, 343, 324; 524/557

(56) References Cited

U.S. PATENT DOCUMENTS

| | | | | |
|---|---|---|---|---|
| 3,470,078 A | * | 9/1969 | King | ........................ 522/166 |
| 5,642,939 A | * | 7/1997 | Comardo | .................... 366/132 |
| 6,074,570 A | * | 6/2000 | Samonides | .................. 216/83 |

* cited by examiner

*Primary Examiner*—Judy M. Reddick
(74) *Attorney, Agent, or Firm*—Kevin S. Dobson

(57) ABSTRACT

The present invention is a process for preparing high concentration polyvinyl alcohol (PVA) aqueous mixtures, wherein the PVA solid concentration is at least 14% in the mixture.

4 Claims, 1 Drawing Sheet

HIGH CONCENTRATION AGITATION OF PVA POLYMER POWDERS

This application claims the benefit of U.S. Provisional Application No. 60/307,408, filed Jul. 24, 2001.

BACKGROUND OF THE INVENTION

Aqueous slurries of polyvinyl alcohol (PVA) polymer are useful in the adhesives industry as well as in the paper industry. To prepare aqueous slurries having a high-concentration of PVA polymer powder (high-concentration PVA slurries) it is necessary to disperse PVA polymer in water.

However, dispersing PVA polymer in water can be problematical. Aqueous PVA mixtures can exhibit strong non-Newtonian behavior (exhibiting Bingham-plastic, shear thinning, and time dependent thixotropic properties), and can require extensive agitation when viscosity is high. PVA polymer in water can form gels, or gel-like mixtures. This is particularly true for high-concentration aqueous PVA mixtures wherein the concentration of PVA in water is more than about 14% PVA by weight, based on the total weight of the PVA/water mixture. PVA/water "gels" can be difficult to use in a manufacturing process because such PVA mixtures can be difficult, if not impossible, to agitate due to high viscosity.

Using conventional mixing techniques can be ineffective in preventing the formation of PVA/water gels. For example, it has been observed that turbine-type impellers do not provide adequate mixing near the surface and along tank circumferences of PVA water mixtures. As a result of weak agitation near the surface a local build-up in viscosity in that region can occur, yielding gels near or at the surface of PVA/water slurries. Also, it can be conventional to use baffles to disrupt laminar flow in a mixing process and reduce or eliminate a vortex formed by the spinning action of an impeller. However, baffles are not suitable for use in the practice of the present invention. In fact, it is surprising that baffles can exacerbate gel formation. Without being held to theory, one explanation of this surprising result is that the baffles act to "hold up" PVA in the area of the baffles, thus causing a local viscosity increase in that region. Over time, the region high in viscosity can expand and cause the entire mixture to "set up" (that is, become gel-like).

It is desirable to prepare an aqueous mixture of polyvinyl alcohol having at least 14% by weight of PVA by a process whereby the viscosity of the mixture does not approximate that of a gel at any time during the process.

SUMMARY OF THE INVENTION

In one aspect, the present invention is a process for preparing an aqueous polyvinyl alcohol (PVA) mixture having at least about 14%, by weight, of PVA comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating a portion of the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture.

In another aspect, the present invention is a process for preparing an aqueous polyvinyl alcohol (PVA) mixture having at least about 14%, by weight, of PVA comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating a portion of the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture, wherein the impeller creates counter-flow mixing pattern in the mixture.

In still another aspect, the present invention is a process for preparing an aqueous polyvinyl alcohol (PVA) mixture having at least about 14%, by weight, of PVA comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating a portion of the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture, wherein the vessel does not include baffles.

In another aspect, the present invention is an aqueous PVA mixture having at least about 14%, by weight, of PVA based on the total weight of the mixture made by the process comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating a portion of the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture.

DETAILED DESCRIPTION

DETAILED DESCRIPTION OF THE INVENTION

Figure 1:
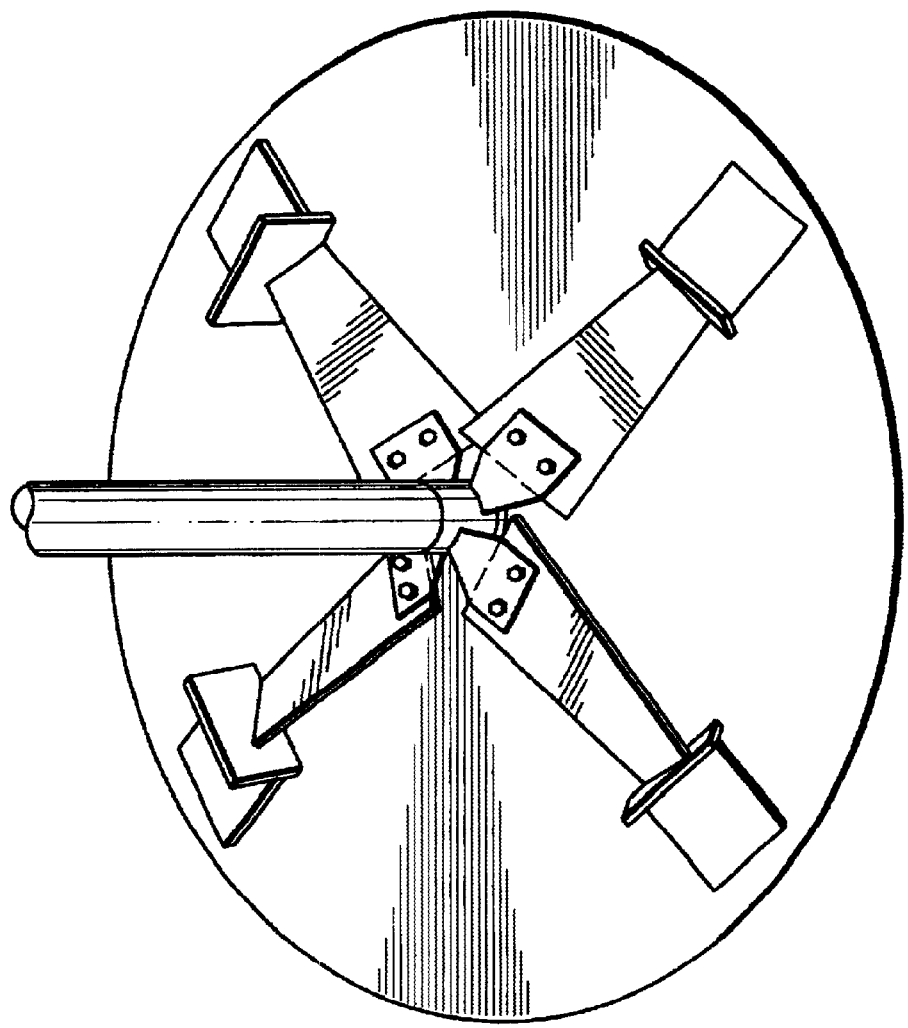
FIG. 1 is an image of a portion of a counter-flow agitator having 4 identical "switch pitch" blades.

In one embodiment, the present invention is a process for preparing high concentration mixtures of PVA in water, wherein the concentration of PVA is greater than 14% by weight, based of the total weight of the mixture. Below a concentration of about 14%, a PVA/water mixture does not tend to exhibit the problem of gel formation to the extent that it interferes with agitation of the mixture. Above a concentration of about 14% gel formation can be a problem using conventional mixing methods.

In a process of the present invention, PVA and water are added into a mixing vessel that is equipped with a means for stirring or agitating the contents. The mixing means is preferably an impeller connected to a shaft that is driven by a variable speed motor, that is a motor that is capable of driving the impeller at various rotational speeds. The impeller design must be such that the impeller imparts sufficient agitation to the fluid contents of the mixing vessel, providing shear to the fluid even in the outer regions of the vessel. The impeller can have a single blade, but preferably has at least two blades. The length of the blades is preferably from 80–90% of the diameter of the mixing vessel. If multiple blades are present, they can be at the same height or at different heights on the impeller shaft. Preferably they are at the same heights on the impeller shaft.

The impeller blades are preferably designed such that they create a counter-flow mixing pattern in the fluid. By counter-flow, it is meant that in one region fluid moves in one direction, and in an adjacent region the fluid moves counter to the movement in the first region. For example, in one the impeller will cause the fluid to move in an upward direction, and in an adjacent region the impeller will cause the fluid to move in a downward direction, thus causing counter-flow in the area where the regions overlap. Particularly suitable for this purpose are blades that are initially pitched at an angle of from 15 to 75° relative to the impeller shaft. The blade pitch angle abruptly changes along the length of the blade to a pitch angle that is from 75 to 105° relative to the initial angle. Preferably the new pitch angle is 90° relative to the initial pitch angle.

The preferred impeller creates a region of high shear in the area where the change in pitch angle occurs, and it is preferable that the change occurs closer to the sides of the mixing vessel. The pitch angle preferably changes at a distance that is from about 32% to about 68% of the radius of the mixing vessel, as measured from the impeller shaft radially to the sides of the vessel.

A mixing vessel suitable for use in the practice of the present invention can be any that is conventional in the mixing art, except that the vessel cannot be equipped with baffles. A vessel of the present invention is optionally equipped to enable recirculation of the mixed fluid such that the fluid is added perpendicular to the surface of the mixture. In any event it is preferable that the recirculated mixture be added in the region of the impeller in such a way that the vortex formed by the rotation of the impeller in the fluid mixture is disrupted to the point of elimination.

PVA and water can be added to an empty mixing vessel. However, the vessel preferably includes some water before addition of the PVA and water starts. If present before addition begins, water is preferably at less than 50% of the volume of the vessel. The PVA and water can be added together as a mixture, or as separate components. It is preferable to add the PVA and water as separate components such that they are added to the vessel in a ratio of at least about 14% by weight, based on the total of the components being added. The components can be added as quickly as practical, but it is preferable to add the components in such a manner that there is not a local increase in viscosity at the point where the PVA is mixed into the vessel.

The temperature of the water in the tank initially, and added to the tank can be from 10° C. to 25° C., at standard atmospheric pressure. It is preferable that the temperature of the water be within 10° C. to 20° C.

The contents of the vessel can be agitated at speeds of at least about 60 rpm. Preferably, the contents are mixed with progressively more energy as the addition proceeds (that is, increasing higher rpm) to provide suitable mixing of the PVA in the water, and control the viscosity of the mixture to a suitably low value. Preferably, the contents are mixed at from 80 to 275 rpm over the course of the addition. More preferably, the contents are mixed at from 80 to 175 rpm over the course of the addition.

A portion of the contents of the vessel can be recirculated into the mixing vessel in any such a manner that the vortex formed by the action of the impeller is eliminated. It is preferred that the mixture is injected back into the vessel at an angle that is perpendicular to the surface of the liquid, and aimed in the region of the impeller. It is also preferable that the mixture is recirculated at a rate that is rapid enough that the recirculated mixture creates strong shearing action in the region surrounding the impeller. One skilled in the art would be able to determine the recirculation rate required for the desired result.

In another embodiment, the present invention is a PVA/water mixture that is at least about 14% by weight PVA, based on the total weight of the mixture, wherein the mixture is obtained according to the process described above. It is preferred that the PVA mixture be at least 16% PVA, more preferably, at least 17%, and even more preferably, at least 19% by weight PVA. It is an object of the present invention to maximize the percentage of PVA dispersed in water.

EXAMPLES

The Examples and comparative examples herein are for illustrative purposes only, and are not intended to limit the scope of the present invention. It is the Applicant's intention that the Doctrine of Equivalents will apply to the present invention.

Ex. 1. Comparative Example

A mixing tank 14.5 inches in diameter and 12.9" high was equipped with a 7" reverse vane turbine impeller (a conventional 8 blade turbine impeller) and baffles with a thickness 1/10 the diameter of the tank fitted along the entire length of the vessel. The tank contained 4.4 gallons water prior to the start of the addition of PVA and water. The contents were stirred initially at a rate of 150 rpm. At about the 14% solids (PVA) level gel abruptly formed at the periphery of the tank. The speed of the mixer was increased to 240 rpm without any effect on the gel. The addition was halted.

Ex. 2 Comparative Example

Experiment 1 was repeated except that the vessel was not equipped with baffles. Gel formed again at about 14% solids, but most of the gel was broken by increasing the mixing speed to 287 rpm. At 19% solids, gel formed again at the periphery and was broken by increasing the speed to 380 rpm. Addition was continued to 20% solids and the mixture again gelled, and the gel was broken again by increasing the speed to 420 rpm.

Example 3

A mixing tank 14.5 inches in diameter and 12.9" high, and no baffles, was equipped with two 10.25" diameter dual blade counter-flow impellers, stacked one on top of the other and offset 90° from each other. The tank contained 4.4 gallons of water prior to the start of the addition of PVA and water. The contents were stirred initially at a rate of 250 rpm. Addition proceeded to 20% solids with no gel formation.

Example 4

Example 3 was repeated, except that only one dual blade counter-flow impeller was used. Slight gel formation at above 17% solids around the rim of the tank at the surface. The speed was increased to 350 rpm to break the gel.

Example 5

A tank with a diameter of 11.375" and 12" high, and no baffles, was equipped with a single 10.5" diameter counter-flow impeller having 4 blades. The tank initially contained 2.1 gallons water prior to the addition of the PVA and water mixture. Stirring was initially at 150 rpm. PVA and water were added all within 60 seconds to 21% solids. Slight gel formation was observed near the end of the addition, but was easily broken up by increasing the speed of the impeller to 250 rpm.

Example 6

A tank with a diameter of 14.5" and height of 12.9", and no baffles, was equipped with a single 12.6" diameter counter-flow impeller having 4 blades. Each blade was an identical "switch-pitch" blade. The agitator was positioned 1⅛" from the bottom of the tank. The tank initially contained 5½" water prior to the addition of the PVA and water mixture. Stirring was initially at 110 rpm. PVA and water were added all within 60 seconds to 21% solids. Slight gel formation was observed near the end of the addition, but was easily broken up by increasing the speed of the impeller to 250 rpm.

Example 7

Example 6 was repeated, with the exception that the water and PVA were added to the tank in stages. At 17–19% solids the rpm was increased to 240, at 21% solids the speed was increased to 250–270 rpm.

Example 8

Example 6 was repeated using PVA powder with larger average particle size than in Example 6. The maximum speed required to eliminate gels was 160 rpm.

Example 9

A tank with a diameter of 14.5" and height of 12.9", and no baffles, was equipped with a single 12.6" diameter counter-flow impeller having two blade pairs. One pair of identical blades were attached directly to the shaft, and had a pitch angle of 450. The other pair of blades were mounted onto long arms which were attached radially to the shaft, so that the blades extended toward the sides of the tank. The blades mounted on the arms had a pitch angle of 90° relative to the other pair of blades. Blade pairs were offset by 900. The agitator was positioned 1-⅛" from the bottom of the tank. The tank initially contained 5½" water prior to the addition of the PVA and water mixture. Stirring was initially at 114 rpm. PVA and water were added all within 90 seconds to 19% solids. Slight gel formation was observed near the end of the addition, but was broken up by increasing the speed of the impeller to 200–280 rpm.

What is claimed is:

1. A process for preparing an aqueous polyvinyl alcohol (PVA) mixture having at least about 14%, by weight, of PVA comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture.

2. A process for preparing an aqueous polyvinyl alcohol (PVA) mixture having at least about 14%, by weight, of PVA comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture, wherein the impeller creates counter-flow mixing pattern in the mixture.

3. A process for preparing an aqueous polyvinyl alcohol (PVA) mixture having at least about 14%, by weight, of PVA comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture, wherein the vessel does not include baffles.

4. An aqueous polyvinyl alcohol (PVA) mixture having at least about 14%, by weight, of PVA based on the total weight of the mixture made by the process comprising the steps: (a) metering water (1) and PVA (2) into a mixing vessel that contains water and is equipped with an impeller for mixing the contents of the vessel, wherein the metered PVA is at least about 14%, by weight, of the total weight of (1) and (2), and wherein the impeller is rotated at a speed of at least about 60 rpm before the PVA is metered into the vessel; (b) increasing the speed of the impeller during the process of metering (1) and (2) into the vessel; (c) optionally recirculating the mixed contents of the vessel back into the vessel such that the recirculated mixture is injected into the vessel at a speed and at a location that eliminates the vortex created by the impeller rotational action; and (d) continuing the addition of (1) and (2) as in step (a) until the mixture has a PVA content of at least about 14%, by weight of the mixture.

\* \* \* \* \*